US009219279B2

(12) United States Patent
Okamoto et al.

(10) Patent No.: US 9,219,279 B2
(45) Date of Patent: Dec. 22, 2015

(54) METHOD FOR PRODUCING ALUMINUM FOIL

(75) Inventors: Atsushi Okamoto, Osaka (JP); Hiroyuki Hoshi, Osaka (JP); Setsuo Andou, Kagoshima (JP)

(73) Assignee: HITACHI METALS, LTD., Tokyo (JP)

( * ) Notice: Subject to any disclaimer, the term of this patent is extended or adjusted under 35 U.S.C. 154(b) by 624 days.

(21) Appl. No.: 13/378,174

(22) PCT Filed: Jun. 28, 2010

(86) PCT No.: PCT/JP2010/060964
§ 371 (c)(1),
(2), (4) Date: Dec. 14, 2011

(87) PCT Pub. No.: WO2011/001932
PCT Pub. Date: Jan. 6, 2011

(65) Prior Publication Data
US 2012/0088153 A1  Apr. 12, 2012

(30) Foreign Application Priority Data
Jun. 29, 2009 (JP) .................. 2009-153923

(51) Int. Cl.
*H01M 4/66* (2006.01)
*C22C 21/00* (2006.01)
(Continued)

(52) U.S. Cl.
CPC ............... *H01M 4/661* (2013.01); *C22C 21/00* (2013.01); *C25D 1/04* (2013.01); *C25D 3/44* (2013.01);
(Continued)

(58) Field of Classification Search
CPC ........................................ C25D 3/44
See application file for complete search history.

(56) References Cited

U.S. PATENT DOCUMENTS

| 5,041,194 | A | * | 8/1991 | Mori et al. ............ 205/237 |
| 2005/0186477 | A1 | | 8/2005 | Ryu |
| 2008/0067972 | A1 | | 3/2008 | Takami et al. |

FOREIGN PATENT DOCUMENTS

| EP | 0274774 | 7/1988 |
| JP | 1-104791 | 4/1989 |

(Continued)

OTHER PUBLICATIONS

International Search Report for International Application No. PCT/JP2010/060964 dated Oct. 5, 2010.

(Continued)

*Primary Examiner* — Patrick Ryan
*Assistant Examiner* — Lucas J O Donnell
(74) *Attorney, Agent, or Firm* — Kratz, Quintos & Hanson, LLP

(57) ABSTRACT

An object of the present invention is to provide a method for producing a high-ductility, high-purity aluminum foil at a high film formation rate by electrolysis using a plating solution having a low chlorine concentration. A method for producing an aluminum foil of the present invention as a means for achieving the object is characterized in that an aluminum film is formed on a surface of a substrate by electrolysis using a plating solution at least containing (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by a general formula: $R^1R^2R^3R^4N.X$ (wherein $R^1$ to $R^4$ independently represent an alkyl group and X represents a counteranion for the quaternary ammonium cation), and then the film is removed from the substrate.

8 Claims, 2 Drawing Sheets

(51) Int. Cl.
*C25D 1/04* (2006.01)
*H01G 9/008* (2006.01)
*H01G 11/28* (2013.01)
*H01G 11/68* (2013.01)
*H01G 11/84* (2013.01)
*C25D 3/66* (2006.01)
*C25D 3/44* (2006.01)
*C22B 21/00* (2006.01)
*H01G 11/02* (2013.01)
*H01G 11/04* (2013.01)

(52) U.S. Cl.
CPC ............. *C25D 3/665* (2013.01); *H01G 9/016* (2013.01); *H01G 11/28* (2013.01); *H01G 11/68* (2013.01); *H01G 11/84* (2013.01); *C22B 21/0038* (2013.01); *H01G 11/02* (2013.01); *H01G 11/04* (2013.01); *Y02E 60/13* (2013.01); *Y10T 428/266* (2015.01)

(56) References Cited

FOREIGN PATENT DOCUMENTS

| | | | | |
|---|---|---|---|---|
| JP | 11-97032 | | 4/1999 | |
| JP | 11097032 A | * | 4/1999 | ............. H01M 4/66 |
| JP | 3054357 | | 4/2000 | |
| JP | 2002-184411 | | 6/2002 | |
| JP | 2002-279999 | | 9/2002 | |
| JP | 2005-108724 A1 | | 4/2005 | |
| JP | 2006-286381 | | 10/2006 | |
| JP | 2007291490 A | * | 11/2007 | |
| JP | 2008-12558 | | 1/2008 | |
| JP | 2008-031551 | | 2/2008 | |
| JP | 2008-195989 A1 | | 8/2008 | |
| JP | 2010-90414 | | 4/2010 | |
| JP | 2010-90414 A1 | | 4/2010 | |
| KR | 2008-0095993 | | 10/2008 | |
| TW | 200724730 | | 7/2007 | |
| WO | WO 2010/044305 A1 | | 4/2010 | |

OTHER PUBLICATIONS

Extended European Search Report dated Jan. 3, 2014 issued in counterpart application No. 10794101.5.

Japanese Office Action dated Dec. 16, 2014, issued in Japanese Patent Application No. 2013-224353, which is a Divisional Application of Japanese Patent Application No. 2011-520907, which is a counterpart to U.S. Appl. No. 13/378,174.

* cited by examiner

Front surface (plating surface) ↓

↑ Back surface (substrate-contact surface)

METHOD FOR PRODUCING ALUMINUM FOIL

TECHNICAL FIELD

The present invention relates to a method for producing an aluminum foil. More specifically, the present invention relates to a method for producing by electrolysis an aluminum foil that is usable, for example, as a positive electrode current collector for electrical storage devices such as lithium-ion secondary batteries and super capacitors (electrical double-layer capacitors, redox capacitors, lithium ion capacitors, etc.).

BACKGROUND ART

It is a well known fact that lithium-ion secondary batteries, which have high energy density and show no significant decrease in discharge capacity, have been used to power sources for mobile tools, such as mobile phones and laptop computers. In recent years, with downsizing mobile tools, there is a need for smaller lithium-ion secondary batteries for use therein. Further, with the development of hybrid cars, solar power generation, and other technologies from the viewpoint of preventing global warming, etc., the application of super capacitors having high energy density, such as electrical double-layer capacitors, redox capacitors, and lithium ion capacitors, has been expanding at an accelerated pace, and there is a need for a further increase in energy density.

An electrical storage device, such as a lithium-ion secondary battery or a super capacitor, is configured, for example, such that a positive electrode, a negative electrode, and a separator made of polyolefine or the like between them are arranged in an organic electrolytic solution containing as an electrolyte a fluorine-containing compound, such as $LiPF_6$ or $NR_4 \cdot BF_4$ (R is an alkyl group). The positive electrode comprises a positive electrode active material, such as $LiCoO_2$ (lithium cobalt oxide) or active carbon, and a positive electrode current collector, while the negative electrode comprises a negative electrode active material, such as graphite or active carbon, and a negative electrode current collector. With respect to their shape, generally, a current collector having applied thereon an active material is formed into a sheet. The electrodes are each subjected to a large voltage and also immersed in a highly corrosive organic electrolytic solution that contains a fluorine-containing compound. Accordingly, materials for a positive electrode current collector, in particular, are required to have excellent electrical conductivity together with excellent corrosion resistance. Under such circumstances, currently, nearly 100% of the time, the material for a positive electrode current collector is aluminum, which is a good electrical conductor and also forms a passive film on the surface to offer excellent corrosion resistance (as materials for a negative electrode current collector, copper, nickel, and the like can be mentioned).

One method for providing an electrical storage device with downsizing and higher energy density is thinning a sheet-shaped current collector that forms an electrode. Currently, an aluminum foil having a thickness of about 15 to 20 μm produced by rolling is commonly used as a positive electrode current collector. Therefore, the object can be achieved by further reducing the thickness of such an aluminum foil. However, in rolling, it is difficult to further reduce foil thickness on an industrial production scale.

Then, a possible aluminum foil production method to replace rolling is a method for producing an aluminum foil by electrolysis. The production of a metal foil by electrolysis is performed, for example, by forming a metal film on a surface of a substrate such as a stainless steel plate by electroplating, followed by the removal of the film from the substrate. Such production is well known as a method for producing a copper foil, for example. However, aluminum is an electrochemically base metal, and thus electroplating is extremely difficult. Therefore, it is not easy to produce an aluminum foil by electrolysis. Patent Document 1 discloses, as a method for producing an aluminum foil by electrolysis, a method that uses an electrolytic bath containing 50 to 75 mol % aluminum chloride and 25 to 50 mol % an alkylpyridinium chloride or an electrolytic bath prepared by adding an organic solvent to such a bath. However, in this method, the chlorine concentration in a plating solution is extremely high. This leads to problems in that during plating, chlorine contained in the plating solution reacts with moisture in the air to generate hydrogen chloride gas, causing the corrosion of equipment. Therefore, it is necessary to take a measure to prevent the generation of hydrogen chloride gas or a measure to protect equipment from corrosion due to the generated hydrogen chloride gas. Further, the method of Patent Document 1 also has problems in that the applicable current density is about 2 $A/dm^2$ maximum, and thus the film formation rate is low (when the applied current density is increased any further, the plating solution decomposes, etc., making it impossible to stably perform plating). The addition of an organic solvent, such as benzene or toluene, to the plating solution is expected to improve the film formation rate. However, these organic solvents have high toxicity and are dangerous because of high inflammability, and, therefore, it must be said that the addition of such organic solvents to a plating solution is problematic in terms of the ease of liquid waste disposal and safety.

PRIOR ART DOCUMENTS

Patent Documents

Patent Document 1: JP-A-1-104791

SUMMARY OF THE INVENTION

Problems that the Invention is to Solve

Thus, an object of the present invention is to provide a method for producing a high-ductility, high-purity aluminum foil at a high film formation rate by electrolysis using a plating solution having a low chlorine concentration.

Means for Solving the Problems

The present inventors have been intensively studying the aluminum electroplating technology. As a result of the research, they have developed a method that uses a plating solution prepared by dissolving an aluminum halide in a dialkyl sulfone (JP-A-2008-31551). Then, the present inventors attempted to produce an aluminum foil by electrolysis using this plating solution. As a result, they found the following: the plating solution has a remarkably lower chlorine concentration than the plating solution used in the method of Patent Document 1, and thus is advantageous in that the generation of hydrogen chloride gas during plating is inhibited, and also stable plating is possible even when a current density of 8 $A/dm^2$ or more is applied to the plating solution, and thus is advantageous in that the film formation rate is high; however, the aluminum film formed on a surface of a substrate is hard with low ductility, and, accordingly, the film breaks upon removal from the substrate. The prevent inventors conducted extensive research to solve this problem. As a result, they found that when a certain nitrogen-containing compound is added to the plating solution, a high-ductility, high-purity aluminum foil can be produced at a higher film formation rate.

A method for producing an aluminum foil of the present invention accomplished based on the above findings is, as defined in claim 1, characterized in that an aluminum film is formed on a surface of a substrate by electrolysis using a plating solution at least containing (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by a general formula: $R^1R^2R^3R^4N.X$ (wherein $R^1$ to $R^4$ independently represent an alkyl group and X represents a counteranion for the quaternary ammonium cation), and then the film is removed from the substrate.

A production method as defined in claim 2 is characterized in that in the production method according to claim 1, the dialkyl sulfone is dimethyl sulfone.

An aluminum foil of the present invention is, as defined in claim 3, characterized by having an aluminum content of 97.0 to 99.9 mass %, S and Cl contents of 1.5 mass % or less each, a Vickers hardness of 40 to 120 Hv, and a thickness of 1 to 15 µm.

An aluminum foil as defined in claim 4 is characterized in that in the aluminum foil according to claim 3, the aluminum foil has a cross-sectional configuration whose crystal structure increases in width from the surface of the aluminum foil that has been closer to a substrate towards the other surface.

A positive electrode current collector for an electrical storage device of the present invention is, as defined in claim 5, characterized by comprising an aluminum foil according to claim 3.

An electrode for an electrical storage device of the present invention is, as defined in claim 6, characterized by comprising an electrode active material supported on an aluminum foil according to claim 3.

An electrical storage device of the present invention is, as defined in claim 7, characterized by being configured using an electrode for an electrical storage device according to claim 6.

Effect of the Invention

The present invention enables the provision of a method for producing a high-ductility, high-purity aluminum foil at a high film formation rate by electrolysis using a plating solution having a low chlorine concentration.

BRIEF DESCRIPTION OF THE DRAWINGS

Similarly.

Similarly.

MODE FOR CARRYING OUT THE INVENTION

Figure 1:
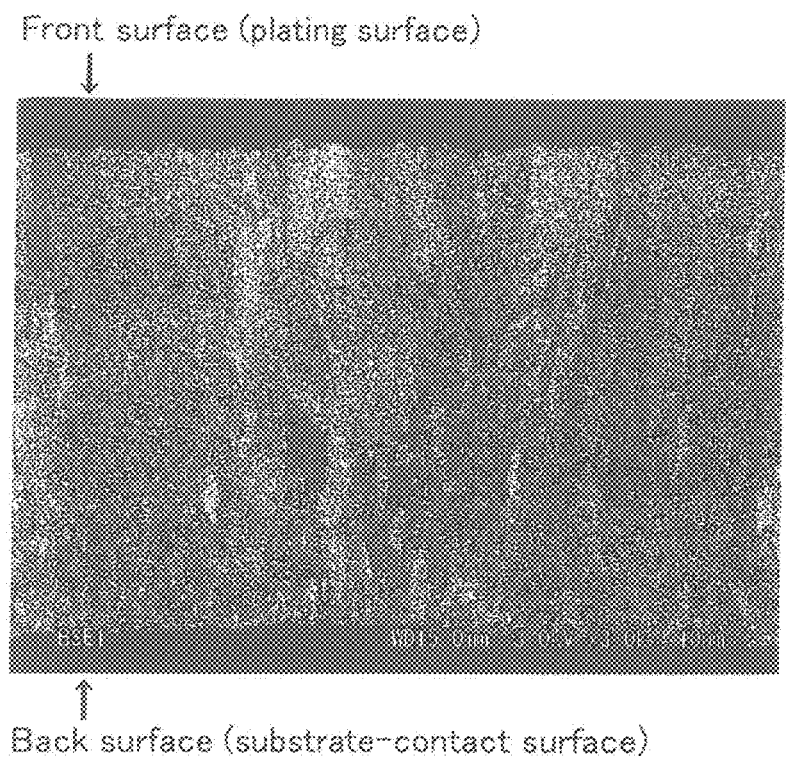
FIG. 1 is a cross-sectional photograph of an aluminum foil produced by a production method of the present invention in Experiment Example 4.

A method for producing an aluminum foil of the present invention is characterized in that an aluminum film is formed on a surface of a substrate by electrolysis using a plating solution at least containing (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by a general formula: $R^1R^2R^3R^4N.X$ (wherein $R^1$ to $R^4$ independently represent an alkyl group and X represents a counteranion for the quaternary ammonium cation), and then the film is removed from the substrate.

Examples of dialkyl sulfones to be contained in the plating solution used in the method for producing an aluminum foil of the present invention include those having a $C_{1-6}$ alkyl group (straight or branched), such as dimethyl sulfone, diethyl sulfone, dipropyl sulfone, dihexyl sulfone, and methylethyl sulfone. In terms of excellent electrical conductivity, availability, and the like, it is preferable to use dimethyl sulfone.

Examples of aluminum halides include aluminum chloride and aluminum bromide. In terms of minimizing the moisture content of the plating solution, which causes the inhibition of the deposition of aluminum, it is preferable to use an anhydride as the aluminum halide.

Examples of ammonium halides usable as the nitrogen-containing compound include ammonium chloride and ammonium bromide. Further, examples of primary to tertiary amines include those having a $C_{1-6}$ alkyl group (straight or branched), such as methylamine, dimethylamine, trimethylamine, ethylamine, diethylamine, triethylamine, propylamine, dipropylamine, tripropylamine, hexylamine, and methylethylamine. Examples of hydrogen halides include hydrogen chloride and hydrogen bromide. Examples of alkyl groups represented by $R^1$ to $R^4$ in a quaternary ammonium salt represented by a general formula: $R^1R^2 R^3R^4N.X$ (wherein $R^1$ to $R^4$ independently represent an alkyl group and X represents a counteranion for the quaternary ammonium cation) include $C_{1-6}$ alkyl groups (straight or branched), such as a methyl group, an ethyl group, a propyl group, and a hexyl group. X may be a halide ion such as a chlorine ion, a bromine ion, or an iodine ion, or may alternatively be $BF_4^-$, $PF_6^-$, or the like, for example. Specific examples of such compounds include tetramethylammonium chloride, tetramethylammonium bromide, tetramethylammonium iodide, and tetraethylammonium tetrafluoroborate. In terms of facilitating the production of a high-ductility, high-purity aluminum foil at a high film formation rate, preferred examples of nitrogen-containing compounds include hydrochlorides of tertiary amines, such as trimethylamine hydrochloride.

Dialkyl sulfone, aluminum halide, and nitrogen-containing compound are added in the following proportions, for example. Per 10 mol of dialkyl sulfone, the amount of aluminum halide is preferably 1.5 to 4.0 mol and more preferably 2.0 to 3.5 mol. The amount of nitrogen-containing compound is preferably 0.01 to 2.0 mol and more preferably 0.05 to 1.5 mol. When the amount of aluminum halide added is less than 1.5 mol per 10 mol of dialkyl sulfone, this may cause the darkening of the formed aluminum film (a phenomenon called burning) or may reduce the film formation efficiency. Meanwhile, when it is more than 4.0 mol, the solution resistance of the plating solution may become too high, whereby the plating solution is heated and decomposed. Further, when the amount of nitrogen-containing compound added is less than 0.01 mol per 10 mol of dialkyl sulfone, the addition is less likely to achieve its effects, that is, effects such as the improvement of the film formation rate owing to the achievement of plating at a high applied current density based on the improved electrical conductivity of the plating solution, the purity increase or ductility improvement in the aluminum foil, etc. Meanwhile, when it is more than 2.0 mol, because of an essential change in the composition of the plating solution, no aluminum may be deposited.

The electroplating conditions may be, for example, conditions where the temperature of the plating solution is 80 to 110° C. and the applied current density is 2 to 15 A/dm². The lower limit of the plating solution temperature is to be determined in consideration of the melting point of the plating solution, and is preferably 85° C. and more preferably 95° C. (when the temperature is below the melting point of the plating solution, the plating solution solidifies, and plating cannot be performed anymore). Meanwhile, when the plating solution temperature is more than 110° C., this may accelerate the reaction between the aluminum film formed on the surface of the substrate and the plating solution, whereby more impurities are incorporated into the aluminum film, resulting in reduced purity. Further, when the applied current density is less than 2 A/dm², the film formation efficiency may decrease, while when it is more than 15 A/dm², because of the decomposition of the nitrogen-containing compound, etc., it may be impossible to stably perform plating or obtain a high-ductility, high-purity aluminum foil. The applied current density is preferably 3 to 12 A/dm². A striking advantage of the plating solution used in the method for producing an aluminum foil of the present invention is that stable plating is possible even when a current density of 10 A/dm² or more is applied, whereby the improvement of the film formation rate can be achieved. Incidentally, the plating time depends on the desired thickness of the aluminum foil, the temperature of the plating solution, the applied current density, and the like, and is usually 1 to 30 minutes. In terms of preventing the degradation of the plating solution to extend the life, it is preferable that the plating environment is a dry atmosphere.

A substrate (cathode) for forming an aluminum film may be, for example, a stainless steel plate, a titanium plate, an aluminum plate, a nickel plate, or the like. Generally, in order to facilitate the removal of an aluminum film from a substrate, it is desired that the substrate has as smooth a surface as possible, such as a mirror-finished surface. However, the aluminum film formed on the surface of the substrate in the present invention is characterized by being easy to remove without subjecting the substrate to such processing (the reason therefor is not necessarily clear, but is presumably related to the following: upon the formation of an aluminum film on the surface of a substrate, the concentrations of S and Cl originated from the plating solution increase near the surface of the aluminum film that is in contact with the substrate). Incidentally, as a material for the anode, aluminum can be mentioned, for example. The aluminum film can be removed from the substrate batchwise. Alternatively, it is also possible to perform the formation and removal of an aluminum film continuously using a cathode drum (e.g., JP-A-6-93490).

According to the method for producing an aluminum foil of the present invention, an aluminum foil having a thickness of 15 μm or less, which has been extremely difficult to produce by rolling, and also an aluminum foil having a thickness of 10 μm or less, which, without exaggeration, has been almost impossible to produce by rolling, can be produced at a high film formation rate by electrolysis using a plating solution having a low chlorine concentration. In addition, the obtained aluminum foil is highly ductile and also highly pure. Specifically, according to the present invention, for example, an aluminum foil having an aluminum content of 97.0 to 99.9 mass %, S and Cl contents of 1.5 mass% or less each (normally 0.01 to 0.5 mass %), a Vickers hardness of 40 to 120 Hv, and a thickness of 1 to 15 μm (a small amount of inevitable C or O from the air may also be contained) can be easily produced with a surface roughness similar to the surface roughness of the substrate (e.g., when the Ra of the substrate is 1 to 10 μm, the Ra of the aluminum foil is about the same). The produced aluminum foil can be used, for example, as a thinned positive electrode current collector for providing an electrical storage device with downsizing and higher energy density. The achievement of an aluminum foil having an Ra of about 1 to 10 μm corresponding to the Ra of a substrate is extremely advantageous in obtaining a positive electrode current collector required to have this level of surface roughness. Further, the plating solution used in the present invention does not require the addition of an organic solvent, such as benzene or toluene, for increasing the film formation rate, and thus offers an advantage in allowing washing with water and easy disposal of liquid waste.

EXAMPLES

Hereinafter, the present invention will be described in detail with reference to the examples, but the following descriptions are not to be construed as restrictive.

Example 1

Dimethyl sulfone, anhydrous aluminum chloride, and trimethylamine hydrochloride were mixed in a molar ratio of 10:3:0.1 and dissolved at 110° C. to give an electrolytic aluminum plating solution. Using an aluminum plate with a purity of 99.99% as the anode and a stainless steel plate having a surface roughness (Ra) of 5 μm as the cathode (substrate for forming an aluminum film), electroplating was performed at an applied current density of 3 A/dm² for 10 minutes with stirring the plating solution and maintaining the plating solution at 95° C. Ten minutes later, the stainless steel plate having an aluminum film formed on the surface thereof was picked up from the plating solution, washed with water, and then dried. Subsequently, from the end portion thereof, forceps was inserted between the aluminum film and the stainless steel plate and moved to slide along the stainless steel plate. As a result, the aluminum film was easily removed from the stainless steel plate, and an aluminum foil was thus obtained. The obtained aluminum foil had a thickness of 5 μm, a surface roughness (Ra) of 5 μm, high aluminum purity (aluminum content: 99.9 mass %, S and Cl contents: 0.04 mass % each), and a Vickers hardness of 50 Hv (load: 0.05 kg). Thus, similarly to an aluminum foil produced by rolling, the aluminum foil was highly ductile. Incidentally, the thickness of the aluminum foil was measured by observing the cross section under a scanning electron microscope (S-800: manufactured by Hitachi, Ltd.) (the same applies hereinafter). The surface roughness (Ra) of the stainless steel plate used as the cathode and the aluminum foil was measured using an ultra-depth shape measuring microscope (VK-8510: manufactured by KEYENCE Corporation). The purity of the aluminum foil was measured as follows. After washing both sides of the aluminum foil with water, the S content was measured using a sulfur analyzer (EMIA-820W: manufactured by HORIBA, Ltd.), while the Cl content was measured using a wavelength-dispersive X-ray fluorescence spectrometer (RIX-2100: manufactured by Rigaku Corporation), and the remainder was defined as the aluminum content (the same applies hereinafter). The Vickers hardness of the aluminum foil was measured using a microhardness tester (MVK-E: manufactured by Akashi Seisakusho, Ltd.) (the same applies hereinafter).

Example 2

Dimethyl sulfone, anhydrous aluminum chloride, trimethylamine hydrochloride, and tetramethylammonium chloride were mixed in a molar ratio of 10:3:0.1:1 and dissolved at 110° C. to give an electrolytic aluminum plating solution. Using the same anode and cathode as in Example 1, electroplating was performed at an applied current density of 12 A/dm$^2$ with stirring the plating solution and maintaining the plating solution at 95° C. Incidentally, the stirring of the plating solution was performed at a higher speed than the stirring performed in Example 1, thereby preventing a decrease in the aluminum ion concentration near the cathode. As a result of the high-speed stirring of the plating solution containing tetramethylammonium chloride, stable electroplating was achieved at an applied current density higher than the applied current density in Example 1, and a 5 µm thick aluminum foil was obtained within a shorter period of time than in Example 1. Similarly to the aluminum foil obtained in Example 1, the obtained aluminum foil had high aluminum purity (aluminum content: 99.9 mass %, S and Cl contents: 0.04 mass % each) and a Vickers hardness of 80 Hv (load: 0.05 kg), together with high ductility.

Example 3

An aluminum foil was obtained in the same manner as in Example 1, except that ammonium chloride was used in place of trimethylamine hydrochloride. The obtained aluminum foil showed similar characteristics to the aluminum foil obtained in Example 1.

Example 4

An aluminum foil was obtained in the same manner as in Example 1, except that dimethylamine hydrochloride was used in place of trimethylamine hydrochloride. The obtained aluminum foil showed similar characteristics to the aluminum foil obtained in Example 1.

Example 5

An aluminum foil was obtained in the same manner as in Example 1, except that tetramethylammonium chloride was used in place of trimethylamine hydrochloride. The obtained aluminum foil showed similar characteristics to the aluminum foil obtained in Example 1.

Example 6

An aluminum foil was obtained in the same manner as in Example 1, except that tetraethylammonium tetrafluoroborate was used in place of trimethylamine hydrochloride. The obtained aluminum foil showed similar characteristics to the aluminum foil obtained in Example 1.

Experiment Example 1

Relation between Amount of Trimethylamine Hydrochloride Added to Electrolytic Aluminum Plating Solution and Purity of Aluminum Foil Aluminum foils were obtained in the same manner as in Example 1, except that dimethyl sulfone, anhydrous aluminum chloride, and trimethylamine hydrochloride were mixed in a molar ratio of 10:3:0.01 or 0.03 and dissolved at 110° C. to give an electrolytic aluminum plating solution. The purity of the aluminum foils was measured, and, together with the purity of the aluminum foil obtained in Example 1, the relation between the amount of trimethylamine hydrochloride added to an electrolytic aluminum plating solution and the purity of an aluminum foil was examined. Table 1 shows the results.

TABLE 1

| | | Amount of Trimethylamine Hydrochloride Added to Plating Solution (molar ratio to 10 mol of dimethyl sulfone) | | |
|---|---|---|---|---|
| | | 0.01 | 0.03 | 0.1 (Example 1) |
| Al Foil Composition (mass %) | Al | 99.5 | 99.8 | 99.9 |
| | S | 0.2 | 0.1 | 0.04 |
| | Cl | 0.3 | 0.1 | 0.04 |

As is clear from Table 1, it was found that with an increase in the amount of trimethylamine hydrochloride added to an electrolytic aluminum plating solution, the purity of the resulting aluminum foil increases.

Experiment Example 2

Relation between Amount of Dimethylamine Hydrochloride Added to Electrolytic Aluminum Plating Solution and Purity of Aluminum Foil Aluminum foils were obtained in the same manner as in Example 4, except that dimethyl sulfone, anhydrous aluminum chloride, and dimethylamine hydrochloride were mixed in a molar ratio of 10:3:0.01 or 0.03 and dissolved at 110° C. to give an electrolytic aluminum plating solution. The purity of the aluminum foils was measured, and, together with the purity of the aluminum foil obtained in Example 4, the relation between the amount of dimethylamine hydrochloride added to an electrolytic aluminum plating solution and the purity of an aluminum foil was examined. Table 2 shows the results.

TABLE 2

| | | Amount of Dimethylamine Hydrochloride Added to Plating Solution (Molar ratio to 10 mol of dimethyl sulfone) | | |
|---|---|---|---|---|
| | | 0.01 | 0.03 | 0.1 (Example 4) |
| Al Foil Composition (mass %) | Al | 99.5 | 99.8 | 99.9 |
| | S | 0.2 | 0.1 | 0.05 |
| | Cl | 0.3 | 0.1 | 0.05 |

As is clear from Table 2, it was found that with an increase in the amount of dimethylamine hydrochloride added to an electrolytic aluminum plating solution, the purity of the resulting aluminum foil increases.

Experiment Example 3

Strength of Aluminum Foil Produced by Production Method of Present Invention

In the same manner as in Example 1 except that the applied current density was 5 A/dm$^2$ and the plating time was varied to 10, 15, and 20 minutes, aluminum foils with thicknesses of 10, 15, and 20 µm, respectively, were obtained (each aluminum content: 99.9 mass %). The tensile strength of the obtained aluminum foils was measured according to JIS Z2241 using an autograph (EZ-Test: manufactured by Shimadzu Corporation). Table 3 shows the results. Further, Table 3 also shows the result of the measurement of the tensile strength of a commercially available, 20 μm thick aluminum foil produced by rolling (manufactured by Nippon Foil Mfg. Co., Ltd.).

TABLE 3

|  | Al Foil by Electrolysis (Present Invention) | | | Al Foil by Rolling (Comparative Example) |
| --- | --- | --- | --- | --- |
| Thickness (μm) | 10 | 15 | 20 | 20 |
| Tensile Strength (N/mm$^2$) | 103.1 | 122.5 | 123.2 | 109.0 |

As is clear from Table 3, it was found that the aluminum foils produced by the production method of the present invention have strength equal to or higher than the strength of the aluminum foil produced by rolling, and that in the case where the thickness is the same, the former has higher strength than the latter.

Experiment Example 4

Figure 2:
FIG. 2 is a cross-sectional photograph of an aluminum foil produced by rolling.

Comparison in Structural Configuration between Aluminum Foil Produced by Production Method of Present Invention and Aluminum Foil Produced by Rolling The cross-sectional configuration of a 25 μm thick aluminum foil obtained in the same manner as in Example 1 except that the applied current density was 5 A/dm$^2$ and the plating time was 25 minutes (aluminum content: 99.9 mass %) and the cross-sectional configuration of a commercially available, 20 μm thick aluminum foil produced by rolling (manufactured by Nippon Foil Mfg. Co., Ltd.) were observed under a scanning electron microscope (S-4300: manufactured by Hitachi Ltd.). FIG. 1 and FIG. 2 show the results, respectively. As is clear from FIG. 1, the aluminum foil produced by the production method of the present invention has a cross-sectional configuration whose crystal structure increases in width from the surface of the aluminum foil that has been closer to the substrate towards the other surface (widens towards the end), while, as is clear from FIG. 2, the aluminum foil produced by rolling has a cross-sectional configuration whose crystal structure is elongated in the rolling direction and thus long sideways. It was thus found that the cross-sectional configurations of the two are completely different.

Experiment Example 5

Easy Removability of Aluminum Film Formed on Substrate Surface

With respect to the aluminum foil obtained by removing the aluminum film from the stainless steel plate in Example 1, the composition near each surface was measured using an X-ray photoelectron spectrometer (ESCA-850M: manufactured by Shimadzu Corporation). As a result, the composition near the surface that had been closer to the substrate was different from the composition near the other surface, and an increase in the concentrations of S and Cl was found in the former, which was not found in the latter. Through a separate experiment, the present inventors have confirmed that in the case where there is a non-energization period before the start of electroplating, the longer the period is, the more the concentrations of S and Cl originated from the plating solution increase near the surface of the aluminum film that is in contact with the substrate, and a greater increase makes it easier to remove the aluminum film from the substrate. Accordingly, this led to the presumption that the reason why an aluminum film formed on the surface of a substrate in the present invention can be easily removed from the substrate is related to an increase in the concentrations of S and Cl near the surface of the aluminum film that is in contact with the substrate. Incidentally, the increase in the concentrations of S and Cl near the surface of the aluminum foil that has been closer to the substrate is cancelled by washing with water or washing using acetone, and thus does not have any adverse effect on the final quality of the aluminum foil (this means that there is an advantage in that after contributing to the removal of the aluminum film from the substrate, it can be washed away).

Application Example 1

Figure 3:
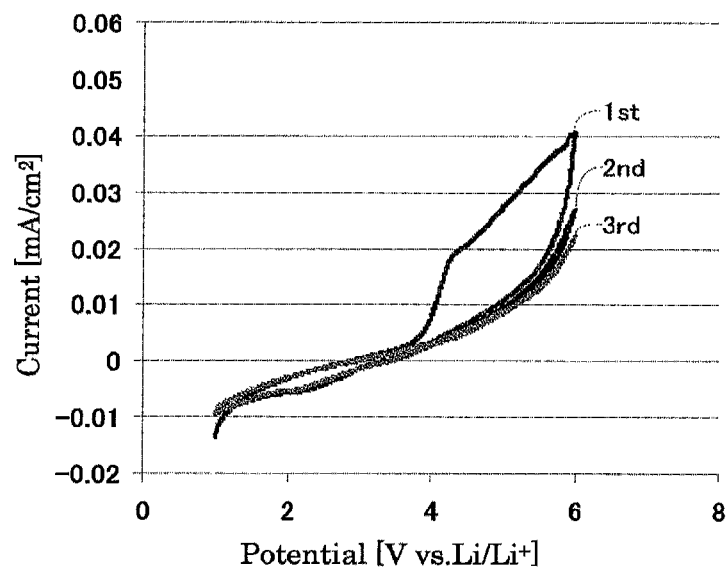
FIG. 3 is a cyclic voltammogram for the case where an aluminum foil produced by a production method of the present invention is used as a test electrode in Application Example 1.
Figure 4:
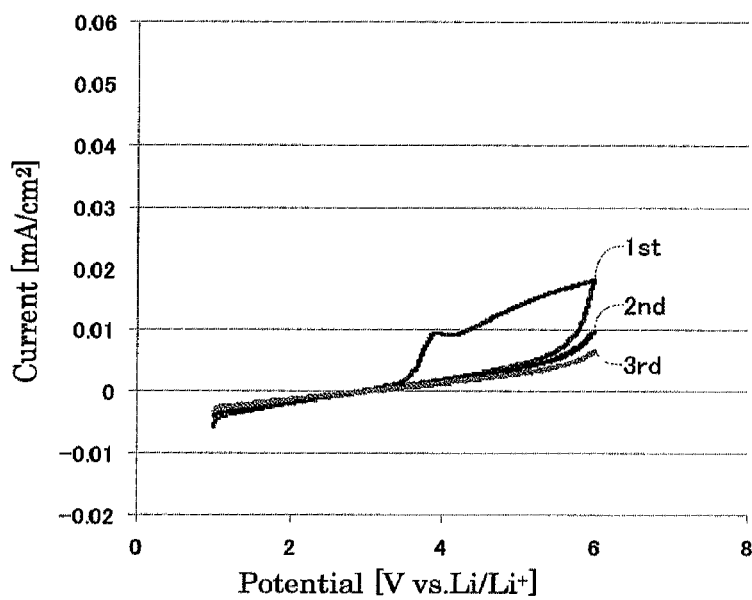
FIG. 4 is a cyclic voltammogram for the case where an aluminum foil produced by rolling is used as a test electrode.

Use of Aluminum Foil Produced by Production Method of Present Invention as Positive Electrode Current Collector for Electrical Storage Device Using a 15 μm thick aluminum foil obtained in the same manner as in Example 1 except that the applied current density was 5 A/cm$^2$ and the plating time was 15 minutes (aluminum content: 99.9 mass %) as a test electrode and lithium foils as a counter electrode and a reference electrode, and also using a solution of LiPF$_6$ dissolved in a mixed solvent of ethylene carbonate and dimethyl carbonate (volume ratio is 1:1) as an electrolytic solution, a three-electrode electrochemical evaluation cell was prepared. Using this electrochemical evaluation cell, the potential of the test electrode was scanned at a scanning rate of 1 mV/sec within a range of 1 to 6 V, and the characteristics were electrochemically evaluated by cyclic voltammetry. FIG. 3 shows the results. Further, FIG. 4 shows the results of the same evaluation using a commercially available, 20 μm thick aluminum foil produced by rolling (manufactured by Nippon Foil Mfg. Co., Ltd.) as a test electrode. As is clear from FIG. 3 and FIG. 4, similarly to the case where the aluminum foil produced by rolling was used as a test electrode, the current-potential curve stabilized from the second cycle also in the case where the aluminum foil produced by the production method of the present invention was used as a test electrode. Accordingly, the aluminum foil produced by the production method of the present invention was found to be applicable as a positive electrode current collector for an electrical storage device.

Application Example 2

Preparation of Electrical Storage Device using Aluminum Foil Produced by Production Method of Present Invention as Positive Electrode Current Collector for Electrical Storage Device Using the aluminum foil obtained in Example 1 as a positive electrode current collector, a positive electrode active material was applied to the surface thereof, and the thus-obtained positive electrode was used to prepare an electrical storage device with a known configuration.

Industrial Applicability

The present invention makes it possible to provide a method for producing a high-ductility, high-purity aluminum foil at a high film formation rate by electrolysis using a plating solution having a low chlorine concentration. In this respect, the present invention is industrially applicable.

The invention claimed is:

1. A method for producing an aluminum foil, characterized in that an aluminum film is formed on a surface of a substrate by electrolysis using a plating solution at least containing (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by a general formula: $R^1R^2R^3R^4N.X$ (wherein $R^1$ to $R^4$ independently represent an alkyl group and X represents a counteranion for the quaternary ammonium cation), and the film is then removed from the substrate, wherein the aluminum foil has a first surface, that is closer to the substrate, and a second surface, wherein the aluminum foil has a cross-sectional configuration whose crystal structure increases in width from the first surface towards the second surface, wherein an Ra of the first surface is 1 to 10 μm, wherein, before a washing, the second surface has first concentrations of S and Cl, and the first surface has second concentrations of S and Cl more than the first concentrations of S and Cl.

2. A production method according to claim 1, characterized in that the dialkyl sulfone is dimethyl sulfone.

3. An electrolytic aluminum foil characterized by having an aluminum content of 97.0 to 99.9 mass %, S and Cl contents of 1.5 mass % or less each, a Vickers hardness of 40 to 120 Hv, and a thickness of 1 to 15 μm, wherein the aluminum foil has a first surface, that is closer to a substrate, and a second surface, wherein the aluminum foil has a cross-sectional configuration whose crystal structure increases in width from the first surface towards the second surface, wherein an Ra of the first surface is 1 to 10 μm, wherein, before a washing, the second surface has first concentrations of S and Cl, and the first surface has second concentrations of S and Cl more than the first concentrations of S and Cl.

4. A positive electrode current collector for an electrical storage device, characterized by comprising an electrolytic aluminum foil according to claim 3.

5. An electrode for an electrical storage device, characterized by comprising an electrode active material supported on an electrolytic aluminum foil according to claim 3.

6. An electrical storage device characterized by being configured using an electrode for an electrical storage device according to claim 5.

7. A method for producing an aluminum foil, characterized in that an aluminum film is formed on a surface of a substrate by electrolysis using a plating solution at least containing (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by a general formula: $R^1R^{\,2}R^3R^4N.X$ (wherein $R^1$ to $R^4$ independently represent an alkyl group and X represents a counteranion for the quaternary ammonium cation), and the film is then removed from the substrate, wherein the aluminum foil has a first surface, that is closer to the substrate, and a second surface, wherein the aluminum foil has a cross-sectional configuration whose crystal structure increases in width from the first surface towards the second surface, wherein an Ra of the first surface is 1 to 10 μm, wherein, after a washing, the second surface has first concentrations of S and Cl, and the first surface has the first concentrations of S and Cl.

8. An electrolytic aluminum foil characterized by having an aluminum content of 97.0 to 99.9 mass %, S and Cl contents of 1.5 mass % or less each, a Vickers hardness of 40 to 120 Hv, and a thickness of 1 to 15 μm, wherein the aluminum foil has a first surface, that is closer to a substrate, and a second surface, wherein the aluminum foil has a cross-sectional configuration whose crystal structure increases in width from the first surface towards the second surface, wherein an Ra of the first surface is 1 to 10 μm, wherein, after a washing, the second surface has first concentrations of S and Cl, and the first surface has the first concentrations of S and Cl.

* * * * *